United States Patent [19]

Read et al.

[11] Patent Number: 4,490,604
[45] Date of Patent: Dec. 25, 1984

[54] INPUT/OUTPUT DEVICE ARRANGEMENTS FOR TERMINALS

[75] Inventors: Clifford D. Read, Almonte; Bruce I. Dolan; Paul D. McDonald, both of Nepean, all of Canada

[73] Assignee: Northern Telecom Limited, Montreal, Canada

[21] Appl. No.: 407,778

[22] Filed: Aug. 13, 1982

[51] Int. Cl.³ .............................................. G06C 7/02
[52] U.S. Cl. ............................... 235/146; 235/145 R; 312/208; 312/274
[58] Field of Search ............... 235/145 R, 145 A, 146; 340/365 R, 365 VL; 312/208, 213, 272, 272.5, 273, 274, 196; 400/473, 682

[56] References Cited

U.S. PATENT DOCUMENTS 3,778,125 12/1973 Gutmann, Jr. et al. ........ 400/682 X
4,316,082 2/1982 Fritz ............................... 312/208 X Primary Examiner—Benjamin R. Fuller
Attorney, Agent, or Firm—Stuart L. Wilkinson

[57] ABSTRACT

In an arrangement of two keyboards or other lamellar input/output devices for a computer or telecommunications terminal, one keyboard is integral with a cabinet of the terminal and the other keyboard normally fits within a housing in an undersurface of the cabinet and is masked by the integral keyboard. To enable withdrawal of the keyboard housed within the housing for use, a rear part of the cabinet undersurface is configured to allow the cabinet to be tilted bodily backwards to allow access to the keyboard. This is then pulled from under the integral keyboard and the cabinet is returned to its stable position. The keyboard housed within the housing is returned to its stored position in a converse manner.

21 Claims, 11 Drawing Figures

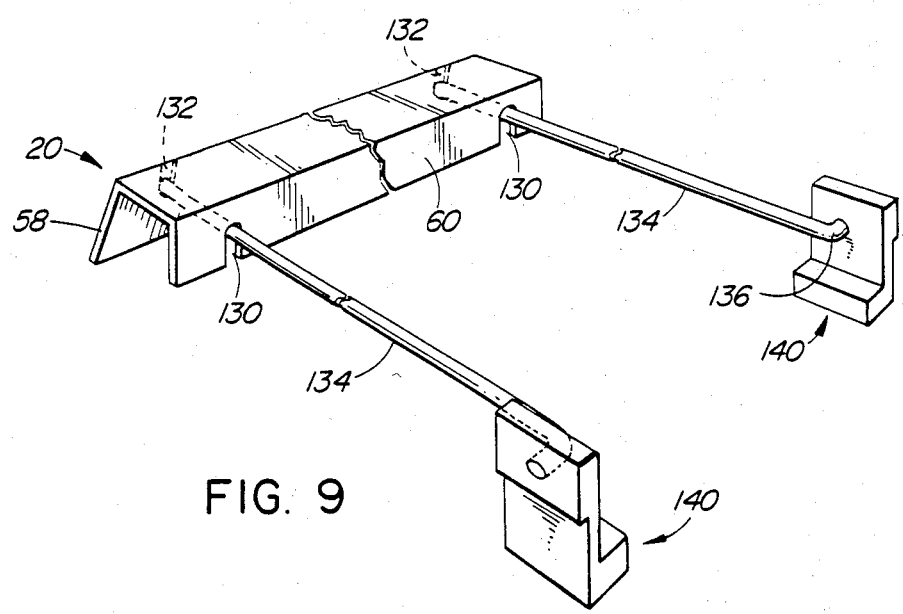
FIG. 9
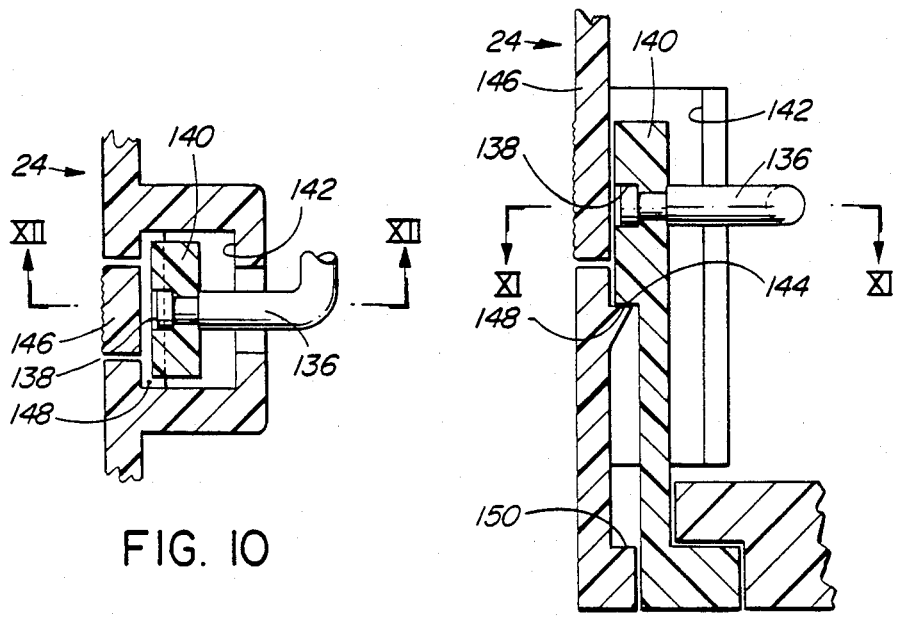
FIG. 10
FIG. 11

INPUT/OUTPUT DEVICE ARRANGEMENTS FOR TERMINALS

This invention relates to a computer or telecommunications terminal and is particularly applicable to such a terminal incorporating a compact arrangement of a plurality of keyboards or like lamellar input/output devices.

Computer and telecommunications terminal equipment must offer a variety of input and output services, examples of which are:

| Input | Output |
| --- | --- |
| Control keyboard | Display |
| Alphanumeric keyboard | Loudspeaker |
| Document scanner | Printer |
| Microphone receiver | |
| Pen digitizer | |
| Magnetic cassette unit | |

Many of the devices for particularly implementing these services are lamellar in character, the reason being that the minimum area of an input/output device is limited by its being directly used by people. Thus, although large scale integration techniques have reduced the size of controlling or controlled electronic circuitry, they cannot reduce the relatively large area of certain input/output devices since that area is set by, for example, human vision (displays), hand size (keyboards), and conventional document size (optical scanners).

In combining input and output devices in a multifunctional terminal equipment, a current design parameter must therefore be their lamellar character.

It is recognized that terminal equipment providing several of the services mentioned previously may, in practice, be operated predominantly to provide only one or two services. For example, in a secretarial environment, a conventional alphanumeric keyboard will be used for a great deal of time in comparison to use, perhaps, of an optical scanner. In contrast, in another environment, the alphanumeric input facility may only occasionally be used. In such circumstances, it is spatially economic and aesthetically desirable to have the less-used input/output device operably exposed only when needed.

According to the invention, there is provided a computer or telecommunications terminal comprising a cabinet having top and bottom surfaces, a housing formed by one part of the bottom surface for housing a lamellar input/output device, another part of the bottom surface being spaced from an underlying planar support surface in a normal operating position of the terminal to permit tilting thereof to lower the other part and to raise said one part of the cabinet bottom surface sufficiently high from the support surface to permit the lamellar input/output device to be slid freely along the surface from under the cabinet.

The parts of the bottom surface can be substantially planar and inclined to one another. The housing can underlie part at least of another lamellar input/output device located at the cabinet top surface. Said one and the other part of the bottom surface can be respectively front and rear parts of the surface.

The cabinet is preferably wedge-shaped having a rear height greater than a front height thereof. The lamellar input/output device housed within the housing can form the top surface of a wedge-shaped unit also having a rear height greater than a front height thereof. In order to provide a uniplanar, composite structure when the input/output devices are used together, the rear height of the unit can be equal to the front height of the cabinet, the cabinet and the unit having substantially identical wedge angles.

The housing can be open at the front of the cabinet in order to provide access to the unit which can be appropriately configured to facilitate withdrawal by a user.

Examples of lamellar input/output devices are keyboards and displays.

The terminal can also include fixture means for retaining the unit within the housing. For example, the fixture means can comprise a base member resiliently mounted on the cabinet and normally biased to a position such as to hold the keyboard in place when the terminal is lifted. The base member can be such as to allow withdrawal of the unit when the cabinet is tilted on a flat support surface.

Alternatively, the base member can normally resiliently bias the cabinet to the tilted position, the terminal further including a latch to latch the cabinet and base member together. In order to eliminate shock as the cabinet is arrested at a tilted or an untilted position, the base member and the cabinet can be linked by a pneumatic shock absorber.

An embodiment of the invention will now be described by way of example, with reference to the accompanying drawings in which:

FIGS. 9, 10 and 11 illustrate an alternative arrangement for retaining the keyboard unit within the cabinet when lifting the cabinet.

Figure 1:
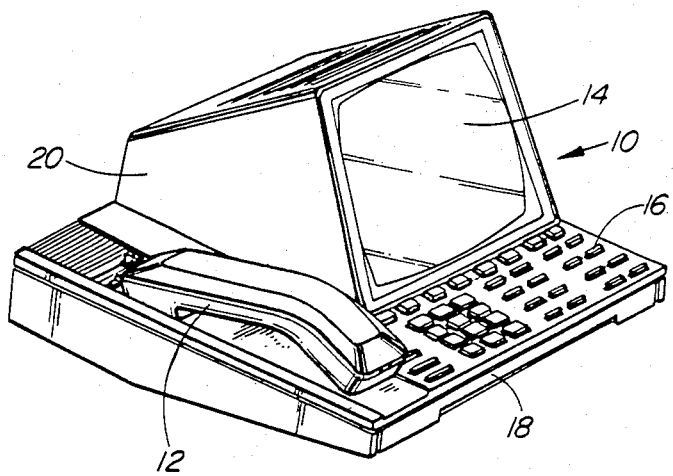
FIG. 1 shows a schematic perspective view of part of a telecommunications terminal having a pair of keyboards, one of the keyboards operably exposed at the cabinet top surface, overlying and masking the keyboard housed within the housing.
Figure 2:
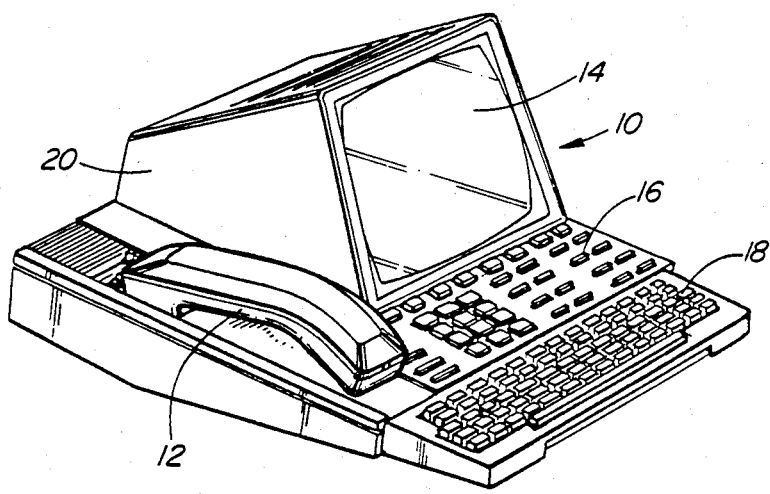
FIG. 2 shows the equipment of FIG. 1 but with both of the keyboards operably exposed.

Referring to the drawings in detail, FIGS. 1 and 2 show a telecommunications terminal 10 incorporating a telephone 12, a visual display unit 14, a control keyboard unit 16, and an alphanumeric keyboard unit 18. The invention is particularly concerned with the manner in which the two flat input devices, the control keyboard unit 16 and the alphanumeric keyboard unit 18 are used relative to each other and to a cabinet 20. Consequently, the other functions of the terminal, i.e. the telephone 12 and the visual display unit 14 will not be described in detail.

Figure 3:
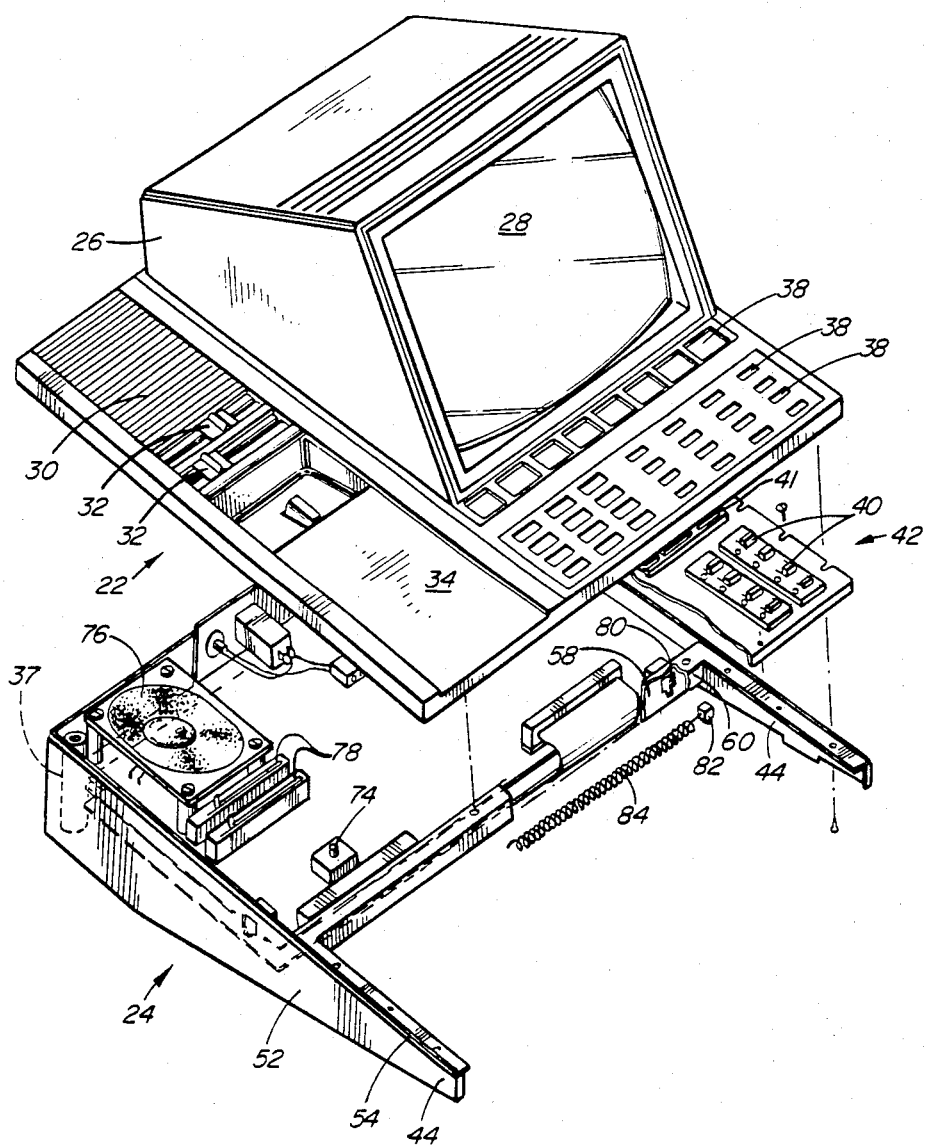
FIG. 3 is an exploded perspective view of a cabinet forming part of the terminal of FIGS. 1 and 2.

Referring to FIG. 3, the cabinet 20 has plastic top and bottom moldings 22 and 24. A frame 26 is attached to the top molding and houses a cathode ray tube (CRT) 28. The top molding 22 has a loudspeaker grid 30, CRT and sound volume controls 32, and a bay 34 for supporting a telephone handset 36. To one side of the bay and in front of the CRT 28 the molding has an array of apertures 38 extending through it. When the moldings 22 and 24 are screwed together at the columns 37, the apertures 38 accommodate keys 40 and 41 of a keyboard 42.

The keyboard 42 and a keyboard 43 used in the alphanumeric unit 18 can be any of a wide variety of marketed products. Examples offering half and full key travel to provide tactile feedback to users are marketed by Keytronics Corporation. As is well-known in the keyboard art, the keyboard circuitry has electrically encoded outputs indicative of the key pressed. The keys of keyboard 42 are printed with control indicia and those of keyboard 43 are printed with alphanumeric designations. In the terminal illustrated, the keys 41 at the rear of control keyboard 42 are soft or programmable keys which permit alteration of their control or instruction designations, these being displayed in a lower part of the viual display unit screen.

Figure 4:
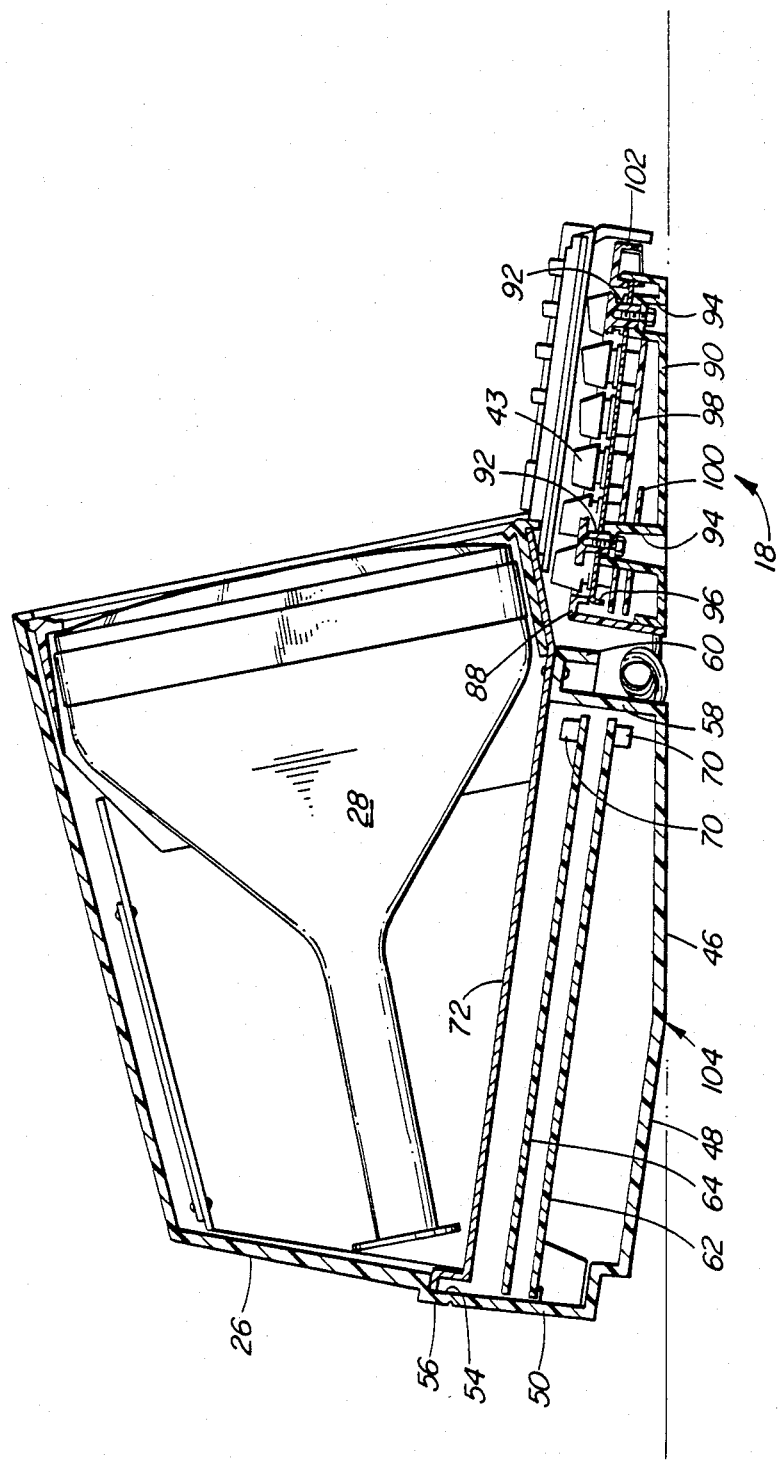
FIG. 4 is a longitudinal sectional view through the cabinet and a keyboard unit forming part of the terminal.
Figure 6:
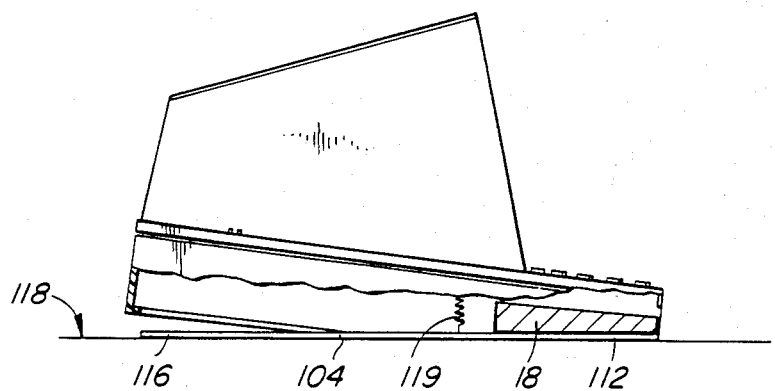
FIGS. 6, 7 and 8 illustrate the use of the FIG. 6 arrangement.

A metal backplate of the keyboard 42 is screwed to opposed elongate legs 44 forming integral parts of the bottom molding 24. As shown in FIGS. 3 and 4, the bottom molding 24 has a base having one part 46 normally flat against a support surface and another part 48 spaced from the support surface. Rear and side walls 50 and 52 have reduced thickness edge formations 54 engaging corresponding edge formations 56 of the top molding. At the front of the molding 24 the legs 44 extend back to a front wall 58 which has a box section portion 60 to give the molding rigidity. A pair of circuit boards 62, 64 which support controlled and controlling electronic circuitry for the various input and output devices of the terminal are supported on an array of knees and columns (not shown) integrally molded with the bottom molding 24. The two boards are connected by a flexible cable 70 and screened from CRT interference by a metal screen 72. The circuit board 60 supports a microswitch 74 which functions as the telephone hook switch and also supports a loudspeaker 76 and slide controls 78 for sound volume and picture control. Mounted within the front wall 58 is a socket 84 connected to the alphanumeric keyboard unit 18.

The keyboard unit 18, which is shown in longitudinal cross section in FIG. 4 has a frame comprising top and bottom molded plastic sections 88 and 90. The moldings have bosses 92 and 94 by means of which the moldings are screwed together to sandwich a baseplate 96 of the keyboard 18 between them. Underneath the baseplate are mounted primary and secondary circuit boards 98 and 100, the circuit boards supporting circuitry providing an interface between the keyboard 18 and the main processor circuit board within the cabinet. Section 88 over part of its front edge has an overhanging lip 102 which in normal use is spaced from the underlying support surface. The frame with the keyboard mounted within is of wedge section. The unit is dimensioned to fit snugly within the wedge shaped space underlaying the keyboard 42 and the front of the CRT 28.

To remove the keyboard unit 18 from underneath the cabinet, the cabinet is tilted rearwardly about a fulcrum zone 104 by pushing the frame 26 backwards. The cabinet pivots about the fulcrum zone to a position in which the rear bottom corner of the cabinet touches the support surface. In this position the lower front edge of the cabinet moulding 22 is spaced sufficiently from the underlaying support surface that the keyboard unit 18 can be freely slid between the two legs 44 from under the cabinet. The user simply tilts the cabinet back with one hand and, by gripping the overhanging lip 102, hooks the keyboard unit out with the other hand. The coiled cable 84 permits the keyboard unit 18 to be removed some distance from the cabinet enabling the user to key in data while the keyboard unit is situated on his or her lap. Once the keyboard unit is removed from the cabinet, the cabinet is allowed to tilt forwards to its stable equilibrium position shown in FIGS. 2 and 4. Optionally, the keyboard unit 18 can be butted up to the front edge of the cabinet, as shown in FIG. 2. For aesthetic and ergonomic reasons, the rear height of the keyboard unit 18 is the same as the front edge height of the cabinet, and the wedge angles of the cabinet and the keyboard unit 18 are identical. Butted together, the keyboard unit forms a composite uniplanar input keyboard.

Figure 5:
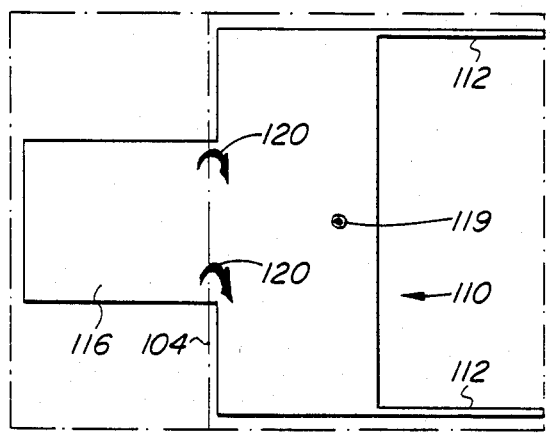
FIG. 5 is a schematic plan view showing one arrangement for retaining the keyboard unit within the cabinet when lifting the cabinet.

Although the keyboard unit 18 is conveniently separable from the cabinet for the user to more comfortably key in data, it may be necessary to transport the complete terminal from one location to another. In these circumstances, it is convenient to have the keyboard unit retained within the cabinet. An optional modification to the terminal for this purpose is shown schematically in FIGS. 5 to 8. As shown in FIG. 5, plan view in a flat frame 110, having the configuration of a tuning fork, is pivotally mounted on the cabinet at the fulcrum zone 104. As shown in the partial front elevation of FIG. 7, forwardly extending limbs 112 pass underneath and support overhanging side edges 114 of the keyboard unit and rearwardly extending limb 116 normally stays in contact with the support surface 118. The limbs 112 are biased upwardly by tension spring 119 against the cabinet bottom surface, the bottom surface of the cabinet being configured to accommodate both pivotal mounting 120 and limbs 112 and 116. In use, if the keyboard unit 18 is to be pulled out or returned to its housing, the terminal 10 is tilted rearwardly as shown in FIG. 8. The frame 110 is prevented from rotating with the cabinet by the contact between the rear limb 116 and the support surface 118 so, as a result of tilting the terminal, the tension spring bias is overcome and the terminal front edge is lifted up without lifting limbs 112.

If it is necessary to move the cabinet from one location to another, the terminal is simply lifted. The weight of the keyboard unit 18 within the housing is insufficient by itself to overcome the spring bias so the unit is retained within the housing. The tension spring 119 could of course be replaced by a compression, torsional or cantilever spring arrangement to the rear of the pivotal mounting 120.

Figure 7:
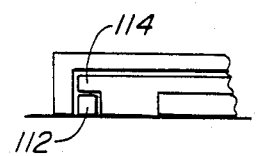
Figure 8:
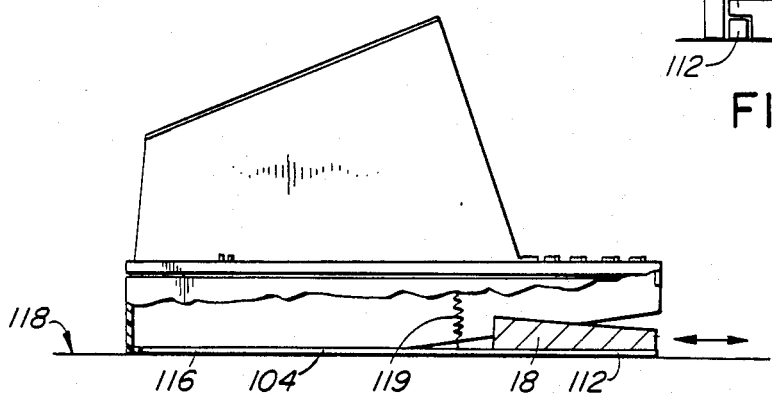

In an alternative arrangement illustrated in FIGS. 9 to 11, the cabinet 20 is resiliently biased towards the backwardly tilted position similar to that shown in FIG. 7 but can be tilted forwardly and locked in place. Referring to FIG. 9 there is shown the cabinet box section 60 evident in FIGS. 3 and 4. This section has apertures 130 and wall 58 has apertures 132 within which rod springs 134 are located. The front end 136 of each rod spring is fixed within an aperture 138 within feet 140. The feet are permitted to slide within vertical tracks 142 formed within bottom molding 24. Each foot 140 has an abutment 144. The cabinet wall adjacent the track has a part 146 partially separated from the main wall to enable it to flex relative to the wall and so function as a pushbutton. As shown in vertical section in FIG. 11 the wall has an abutment 148 within the track. When the feet are engaged within the tracks, the particular disposition of apertures 130 and 132 is such as to bias the spring rod ends 136 and thus the feet 140 downwards and outwards. When the cabinet 20 is in the FIG. 6 position the abutments 144 and 148 contact to prevent relative movement. When the parts 146 are pressed inwardly, the feet 140 are pushed away from abutments 144 so freeing the feet and enabling them to slide in their tracks 142. Since the feet 140 contact support surface 118, the cabinet 20 is forcibly tilted backwards. The feet 140 continue to slide within the tracks 142 until relative motion is arrested by another abutment 150. In this position the keyboard unit 18 can be freely slid from under the cabinet. When the keyboard unit 18 is finished with, it is returned to position under the cabinet and the upper keyboard 16 is pressed down to latch the cabinet in the FIG. 1 position.

In order that the CRT may not be damaged by shock as the cabinet 10, on reaching one or other of its extreme positions, has its pivotal motion arrested by part of the cabinet striking the support surface 118, the cabinet and the frame 110 may be linked by a simple shock absorber arrangement (not shown).

Although not shown in the illustrations, the cabinet wall has strengthened apertures at which adaptor jacks are mounted for attachment to a telephone line and the telephone handset. Other passages extending through the cabinet wall permit access for tuning the display CRT and inspection of the circuit boards 62 and 64.

As shown in FIG. 1, the alphanumeric keyboard unit 18, since it is used relatively occasionally, is normally maintained within the cabinet housing underneath the control keyboard unit 16. This arrangement offers advantages of input device protection, aesthetic appearance, and spatial economy compared with having a permanently exposed alphanumeric keyboard. The contour of the frame at the front edge is complimentary to the contour of the remaining front and side edges of the cabinet mouldings 22 and 24 so that when the frame is fully inserted, its presence cannot be easily detected.

A variety of lamellar input/output devices can be used in place of the keyboard units. The exposed positions of the input/output devices depend on their functions. Thus, for example, a printing or document scanning unit must be so mounted relative to the cabinet base that paper feed in and out of the cabinet is permitted. Also, ergonomically, it may be preferable to have certain input/output devices closer to the terminal operator than other devices. Although it seems clear that the majority of terminal input/output devices must be characterized by relatively large area in view of their dependence on human vision, hand size, or document size, this is certainly not true of all input/output devices that may be incorporated in future terminal equipment. A multiplicity of small input/output devices can be arranged in a single lamellar structure to contribute to the aesthetic appearance and spatial economy of terminal equipment incorporating large area lamellar input/output devices. Thus, for example, loudspeaker and microphone components of a handsfree telephone unit could be placed together with a magnetic cassette input unit or optical disc memory as a single lamellar structure. Also, some of the lamellar input/output devices can be vertically integrated to provide a dual function. For example, a pressure sensitive overlay for a display, allowing display and touch input simultaneously, is made by Sierracin Corporation and marketed under the registered trademark "Transflex". An alternative example of a flat panel display and touch input unit is made by General Digital Corporation and marketed under the registered trademark "VuePoint". Liquid crystal and LED displays suitable for packaging into a lamellar unit are made by a number of companies including Philips Corporation. A further advantage of having the lamellar input/output devices closely positioned is that they can use common interface circuitry to the main memory and processing units within the cabinet.

Although in the embodiments described, the cabinet bottom surface has a rear part inclined to a front part thereof, the cabinet bottom surface could alternatively be stepped in order to space the rear part of the bottom surface from a support surface. Also, although not considered so convenient for use, instead of tilting to access an input/output device from a housing at the front of the terminal the cabinet may be designed to be tilted to access an input/output device from a housing at the rear or side of the cabinet.

What is claimed is:

1. A computer or telecommunications terminal comprising a cabinet having top and bottom surfaces, a housing formed by one part of the bottom surface for housing a lamellar input/output device, another part of the bottom surface being spaced from an underlying planar support surface in a normal operating position of the terminal to permit tilting thereof thereby to lower the other part and to raise said one part of the cabinet bottom surface sufficiently high from the support surface to permit the lamellar input/output device to be slid freely along the support surface from under the cabinet.

2. A computer or telecommunications terminal as claimed in claim 1, in which the other part of the bottom surface has a marginal part contacting the support surface in a normal operating position of the terminal, said marginal part being substantially planar, said one part of the bottom surface being substantially planar, the plane of said one part and that of the marginal part being inclined to one another.

3. A computer or telecommunications terminal as claimed in claim 1, the terminal having another lamellar input/output device located at the cabinet top surface, said another lamellar input/output device at least partly overlying the lamellar input/output device housed within said housing.

4. A computer or telecommunications terminal as claimed in claim 1, in which said one part of the bottom surface is at the front of the cabinet and the other part of the bottom surface is at the rear thereof.

5. A computer or telecommunications terminal as claimed in claim 4, the cabinet being wedge-shaped with a rear height greater than a front height, the lamellar input/output device forming the top surface of a wedge-shaped unit having a rear height greater than a front height thereof, the rear height of the unit being equal to the front height of the cabinet, and the cabinet and the unit having substantially identical wedge angles.

6. A computer or telecommunications terminal as claimed in claim 5, in which the housing is open both at the support surface and over part at least of the front of the cabinet.

7. A computer or telecommunications terminal as claimed in claim 3, in which the lamellar input/output devices are keyboards.

8. A computer or telecommunications terminal as claimed in claim 2, in which the cabinet has a stable equilibrium position in which it is supported at said marginal part of the bottom surface and at a fulcrum zone at a junction between the bottom surface front part and the bottom surface rear part.

9. A computer or telecommunications terminal as claimed in claim 1, in which the lamellar input/output device, when housed within said housing, has a front edge exposed at the front of the cabinet.

10. A computer or telecommunications terminal as claimed in claim 9, wherein the lamellar input/output device is mounted in a frame, the frame having gripping means integrally formed with a front edge thereof.

11. A computer or telecommunications terminal as claimed in claim 10, in which the gripping means comprises an overhanging lip at the front edge of the frame.

12. A computer or telecommunications terminal as claimed in claim 1, further comprising fixture means for retaining the lamellar input/output device within the housing.

13. A computer or telecommunications terminal as claimed in claim 12, in which the fixture means is a base member which, in said normal operating position of the terminal, contacts the support surface, the base member being resiliently mounted on the cabinet.

14. A computer or telecommunications terminal as claimed in claim 13, in which the resilient mounting is such as normally to bias the cabinet towards an untilted position.

15. A computer or telecommunications terminal as claimed in claim 13, in which the resilient mounting is such as normally to bias the cabinet towards a tilted position, the terminal further including a latch to latch the cabinet and the base member together.

16. A computer or telecommunications terminal as claimed in claim 13, in which the base member has one part resiliently biased towards the cabinet and extending forwardly from a pivotal mounting position to underlie the housing, and another part which extends rearwardly from the pivotal mounting position, said two parts of the base member being substantially coplanar.

17. A computer or telecommunications terminal as claimed in claim 1, in which the cabinet houses drive and driven electronic circuits electrically connected to the lamellar input/output device.

18. A computer or telecommunications terminal as claimed in claim 17, in which a flexible conductor connects the lamellar input/output device to the drive and driven electronic circuits.

19. A computer or telecommunications terminal as claimed in claim 1, in which the housing extends between spaced legs forming part of the cabinet.

20. A computer or telecommunications terminal as claimed in claim 3, in which at least one of the input/output devices is a display.

21. A computer or telecommunications terminal comprising a cabinet having top and bottom surfaces, the bottom surface having at a housing zone a depression for housing a lamellar input/output device, the bottom surface having a contact zone at which, in normal operating position of the terminal, the cabinet contacts a planar support surface, the bottom surface having a spaced surface zone which, in said normal operating position, is spaced from the support surface, the bottom surface having a fulcrum which, in said normal operating position, contacts the support surface, the cabinet being pivotable about the fulcrum to an access position in which part at least of the spaced surface zone contacts the support surface and the housing zone is removed sufficiently far from the support surface as to permit said lamellar input/output device to be freely slid from under the cabinet, said terminal further comprising another lamellar input/output device located at the cabinet top surface.

* * * * *